(12) United States Patent
Moriyama et al.

(10) Patent No.: US 7,208,114 B2
(45) Date of Patent: Apr. 24, 2007

(54) GOLF BALL MANUFACTURING METHOD

(75) Inventors: Keiji Moriyama, Kobe (JP); Takashi Sasaki, Kobe (JP); Akira Kato, Kobe (JP); Tsutomu Hirau, Kobe (JP); Masaaki Kikuchi, Kobe (JP)

(73) Assignee: SRI Sports Limited, Kobe (JP)

( * ) Notice: Subject to any disclaimer, the term of this patent is extended or adjusted under 35 U.S.C. 154(b) by 392 days.

(21) Appl. No.: 10/671,772

(22) Filed: Sep. 29, 2003

(65) Prior Publication Data

US 2004/0061255 A1    Apr. 1, 2004

(30) Foreign Application Priority Data

Sep. 30, 2002    (JP) ............................. 2002-285157

(51) Int. Cl.
*B29C 43/18*    (2006.01)
*B29C 43/20*    (2006.01)

(52) U.S. Cl. ..................... 264/248; 264/250; 264/254; 264/255; 264/279.1

(58) Field of Classification Search ................ 264/248, 264/250, 254, 255, 279.1
See application file for complete search history.

(56) References Cited

U.S. PATENT DOCUMENTS

| | | | | |
|---|---|---|---|---|
| 3,819,795 | A | * | 6/1974 | Martin et al. ................ 264/248 |
| 4,501,715 | A | * | 2/1985 | Barfield et al. .............. 264/248 |
| 6,093,357 | A | * | 7/2000 | Bissonette et al. ........... 264/248 |
| 6,846,442 | B2 | * | 1/2005 | Sugimoto .................... 264/161 |
| 6,905,647 | B2 | * | 6/2005 | Endo et al. .................. 264/248 |

* cited by examiner

*Primary Examiner*—Edmund H. Lee
(74) *Attorney, Agent, or Firm*—Birch, Stewart, Kolasch & Birch, LLP.

(57) ABSTRACT

A golf ball is provided which contains a core and a cover. In the forming of the cover, two half shells made from a thermoplastic resinous composition are used to cover the core, the composite is put in a spherical mold, then, the mold is clamped. Thereafter, the thermoplastic resin where it is heated and pressurized at a pressure of 5 kgf/cm² to 50 kgf/cm², and the excess thermoplastic resin composition flows out of the spherical cavity. Subsequently, the thermoplastic resin composition is heated in the spherical cavity and is pressurized at a pressure of 70 kgf/cm² or more whereby the cover is formed. The total volume of the two half shells is 105% to 120% of the volume of the cover.

5 Claims, 4 Drawing Sheets

GOLF BALL MANUFACTURING METHOD

BACKGROUND OF THE INVENTION

This nonprovisional application claims priority under 35 U.S.C. § 119(a) on Patent Application No(s). 2002-285157 filed in JAPAN on Sep. 30, 2002, which is(are) herein incorporated by reference.

1. Field of the Invention

The present invention relates to a method of manufacturing a golf ball. More particularly, the present invention relates to an improvement in a method of compressing and molding a cover.

2. Description of the Related Art

A wound ball was once a mainstream of a golf ball. The wound ball comprises a core upon which a rubber thread is wound, and a cover. A compression molding method is employed for forming the cover. In the compression molding method, two half shells formed of a cover material and a core covered with the half shells are put in a mold. The mold is clamped so that the cover material is pressurized and the excessive cover material flows out of a spherical cavity. Air present between the core and the half shell is discharged from the spherical cavity with the flow of the cover material. A part of the air is absorbed in the small spaces between rubber threads.

In recent years, a solid ball has been a mainstream in place of the wound ball. The solid ball comprises a solid core having a single layer or a plurality of layers, and a cover. A compression molding method or an injection molding method can be employed for molding the cover. In general, the injection molding method having excellent mass productivity is employed.

In the injection molding method, first of all, a core is held on the center of a spherical cavity with a holding pin. Next, a molten thermoplastic resin composition is injected into a clearance between a cavity surface and the core. In the final stage of the injection, the holding pin is moved backward. In some cases, therefore, the core is moved from the center with the flow of the resin composition. Due to movement, the thickness of a cover becomes unequal. In some cases, a cover having an unequal thickness is molded due to the deformation of the core which is caused by injection pressure. The unequal thickness of the cover causes the physical properties of the golf ball to be nonuniform. In a golf ball having a small nominal thickness of the cover, particularly, the inequality of the thickness of the cover, seriously affects the physical properties of the golf ball. With respect to the uniformity of the golf ball, the injection molding method has limitations.

If the solid ball is manufactured by the compression molding method, the inequality of the thickness of the cover is caused with difficulty. In the case in which the solid ball is to be formed by the compression molding method, however, a part of the air present between a solid core and a half shell is apt to remain in the cover material. The reason is that the solid core has no space which is seen in a wound core. In the compression molding method, the cover material excessively flows out so that the clearance between a cavity surface and the core is insufficiently filled in some cases. This phenomenon is referred to as bare. In the case in which a cover having a small nominal thickness is to be molded, the air residue and the bare are apt to be generated.

SUMMARY OF THE INVENTION

It is an object of the present invention to provide a method of manufacturing a golf ball in which the defect rate is reduced. The method of manufacturing a golf ball according to the present invention comprises the following steps:

(1) a first step of forming a bowl-shaped half shell from thermoplastic resin composition;

(2) a second step of putting two half shells and a solid core covered with the half shells in a mold including upper and lower portions, each of which has a hemispherical cavity, in a state in which the mold is opened;

(3) a third step of clamping the mold;

(4) a fourth step of heating the thermoplastic resin composition in a spherical cavity formed by the mold clamping and pressurizing the thermoplastic resin composition at a pressure of 5 kgf/cm$^2$ to 50 kgf/cm$^2$, and causing the excessive thermoplastic resin composition to flow out of the spherical cavity; and (5) a fifth step of heating the thermoplastic resin composition in the spherical cavity and pressurizing the thermoplastic resin composition at a pressure of 70 kgf/cm$^2$ or more, and forming a cover.

In the method of manufacturing a golf ball, the total volume of the two half shells in the second step is set to be 105% to 120% of a volume of the cover.

In this manufacturing method, the defect of the golf ball can be reduced by a multiplier effect that the thermoplastic resin composition is pressurized at a low pressure in the fourth step and the total volume of the two half shells is set to be 105% to 120% of the volume of the cover.

It is preferable that a difference (T2−Ts) between the highest temperature T2 of the mold and a softening point Ts of the thermoplastic resin composition through the fourth and fifth steps should be set to be 30° C. to 80° C. In this manufacturing method, the defect rate can be more reduced.

It is preferable that a transition from the fourth step to the fifth step should be carried out within a period of 30 seconds before and after the mold reaches the highest temperature T2. In this manufacturing method, the defect rate can further be reduced.

It is preferable that a difference (Ts−T1) between a softening point Ts of the thermoplastic resin composition and a temperature T1 of the mold at time of start of the fourth step should be 15° C. or more. In this manufacturing method, the thermoplastic resin composition can be prevented from excessively flowing out.

The manufacturing method according to the present invention is suitable for a golf ball in which a cover has a nominal thickness of 0.3 mm to 1.0 mm.

DESCRIPTION OF THE PREFERRED EMBODIMENTS

The present invention will be described below in detail based on a preferred embodiment with reference to the drawings.

Figure 1:
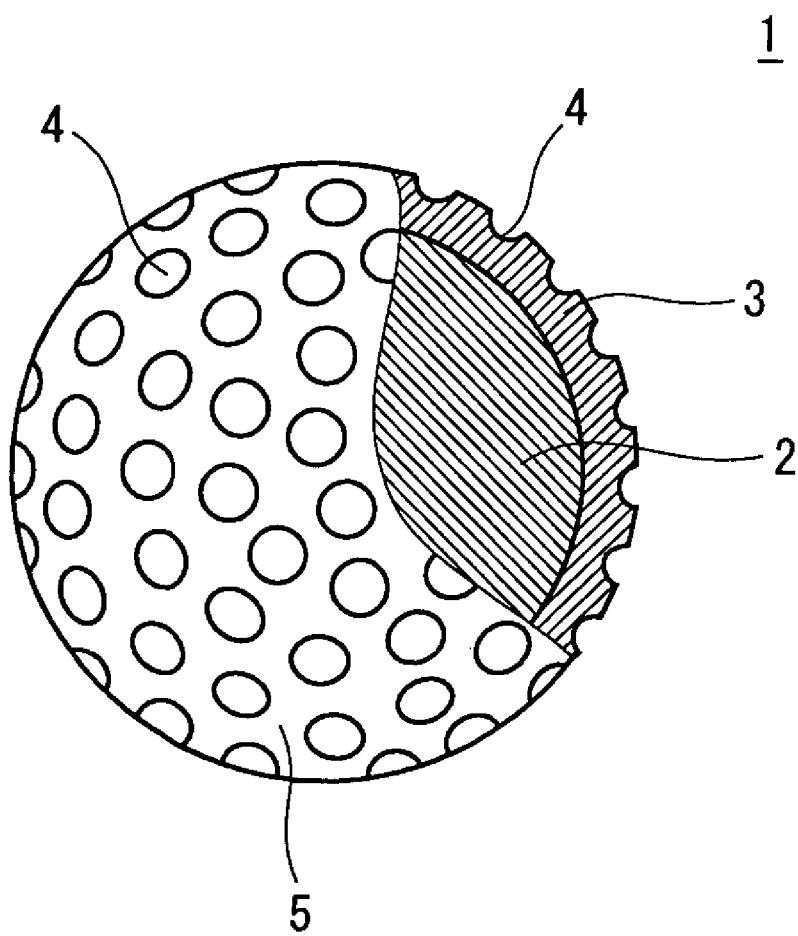
FIG. 1 is a sectional view showing a golf ball obtained by a manufacturing method according to an embodiment of the present invention, a part of which is taken away.

A golf ball 1 shown in FIG. 1 comprises a spherical core 2 and a cover 3 positioned on the outside of the core 2. The core 2 is formed by crosslinking a rubber composition. A large number of dimples 4 are formed on the surface of the cover 3. A portion of the surface of the cover 3 other than the dimple 4 is a land portion 5. The golf ball 1 has a paint layer and a mark layer on the outside of the cover 3 which are not shown.

The golf ball 1 has a diameter of 40 mm to 45 mm, preferably 42 mm to 44 mm. In consideration of a reduction in the air resistance within such a range that the standards of the United States Golf Association (USGA) are satisfied, it is particularly preferable that the diameter should be 42.67 mm to 42.80 mm. The golf ball 1 has a weight of 40 g to 50 g, preferably 44 g to 47 g. In consideration of an enhancement in the inertia within such a range that the standards of the USGA are satisfied, it is particularly preferable that the weight should be 45.00 g to 45.93 g.

Figure 2:
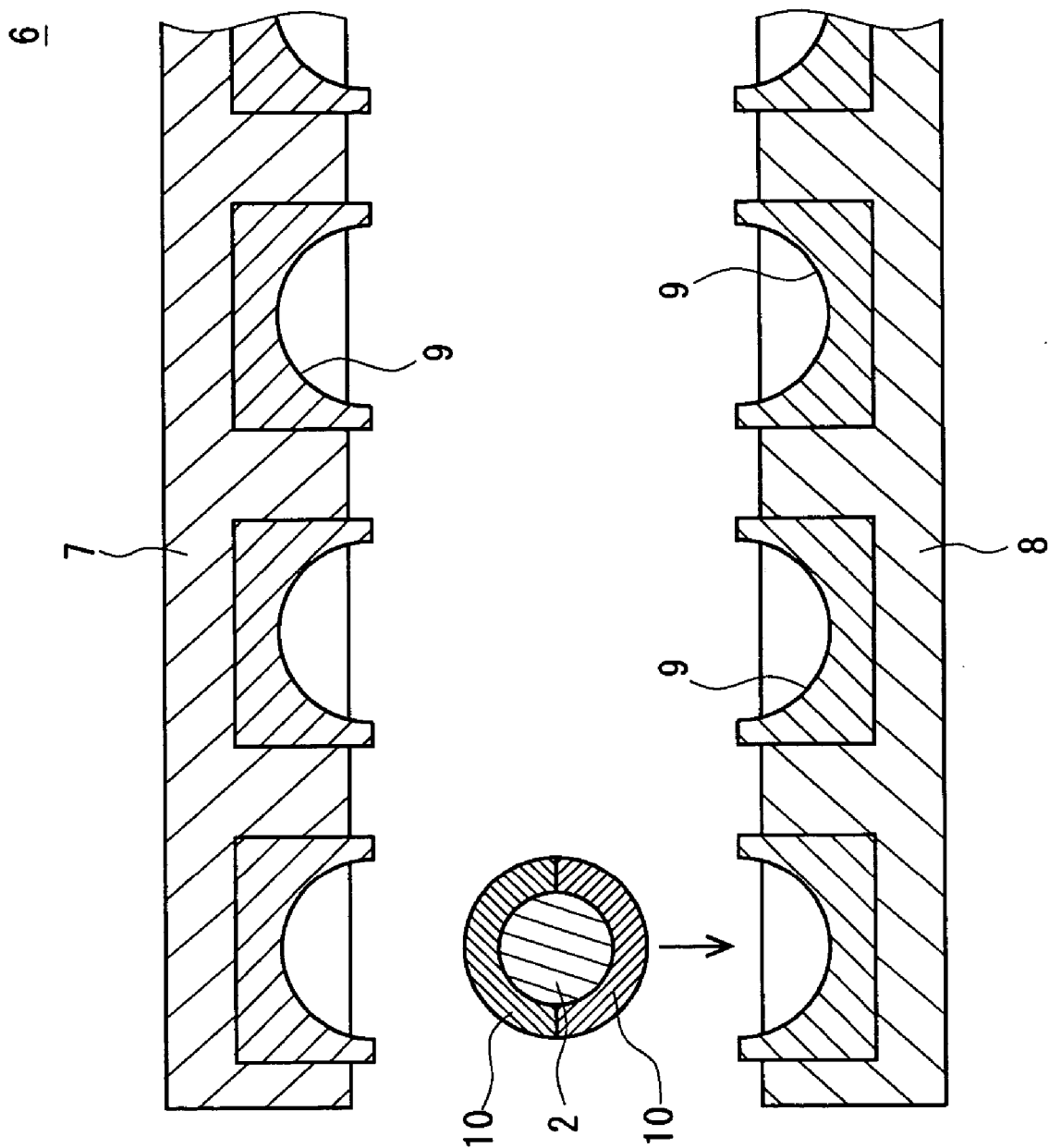
FIG. 2 is a sectional view showing a part of a mold to be used for manufacturing the golf ball in FIG. 1.

FIG. 2 is a sectional view showing a part of a mold 6 to be used for manufacturing the golf ball 1 in FIG. 1. The mold 6 comprises an upper portion 7 and a lower portion 8. Each of the upper portion 7 and the lower portion 8 includes a large number of cavity surfaces 9, and a hemispherical cavity is formed by the cavity surface 9. The upper portion 7 and the lower portion 8 are mated together to form a spherical cavity. A large number of projections are formed on the cavity surface 9, which is not shown. The dimples 4 are formed by the projections as will be described below.

Figure 3:
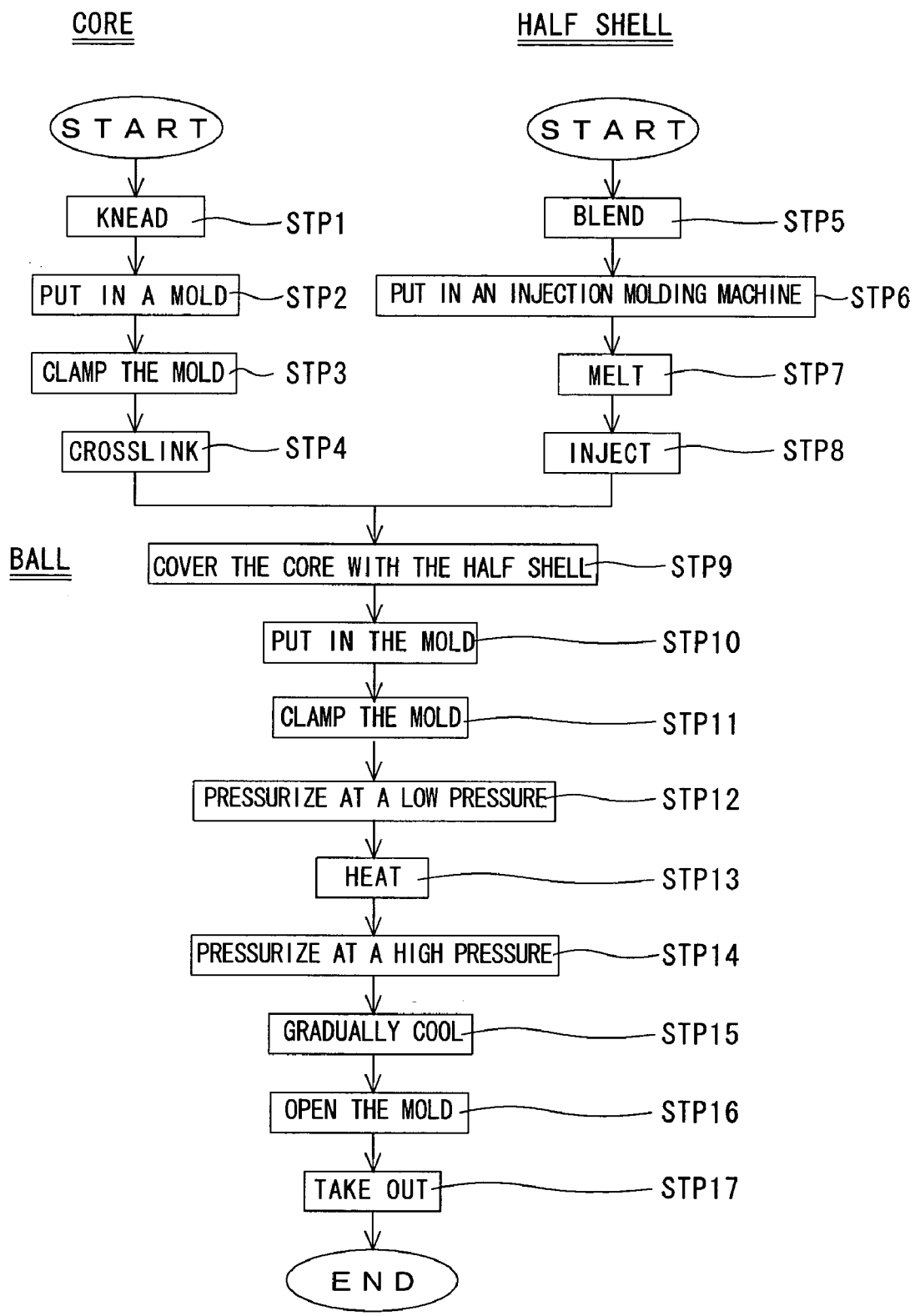
FIG. 3 is a flow chart showing an example of the method of manufacturing the golf ball in FIG. 1.

FIG. 3 is a flow chart showing an example of a method of manufacturing the golf ball 1 in FIG. 1. In this manufacturing method, first of all, a base rubber, a crosslinking agent and various additives are kneaded so that a rubber composition is obtained (STP1). Next, the rubber composition is put in a mold (not shown) having an upper portion and a lower portion and having a spherical cavity (STP2). Then, the mold is clamped (STP3). Thereafter, the rubber composition is heated through the mold. By the heating, a rubber causes a crosslinking reaction (STP4). The rubber composition is cured by the crosslinking so that the spherical solid core 2 is obtained. By adjusting the time required for the heating and the temperature, the core may be brought into a semicrosslinking state. A core in an uncrosslinking state may be prepared. A core having two layers or more may be prepared.

On the other hand, a thermoplastic resin and various additives are blended so that a resin composition is obtained (STP5). Next, the resin composition is put into an injection molding machine (STP6). The resin composition is heated in the cylinder of the injection molding machine and is molten (STP7). Then, the molten resin composition is injected into a mold (not shown) (STP8). The mold includes an upper portion having a convex portion and a lower portion having a concave portion. The resin composition is filled in a clearance between the convex portion and the concave portion. Thus, a half shell 10 (see FIG. 2) is obtained. The half shell 10 takes the shape of a bowl.

Next, the core 2 is covered with two half shells 10 (STP9). Then, the half shells 10 and the core 2 are put in the mold 6 as shown in an arrow of FIG. 2 (STP10). The half shells 10 and the core 2 are usually mounted on the cavity surface 9 of the lower portion 8.

Subsequently, the lower portion 8 is gradually lifted so that the mold 6 is clamped (STP11). The mold clamping is carried out by a press machine. By the mold clamping, the half shell 10 (that is, the thermoplastic resin composition) is pressurized (STP12). The pressure is comparatively low. Simultaneously with the mold clamping, the temperature of the mold 6 is gradually raised so that the resin composition is heated through the mold 6 (STP13). By the heating, the resin composition becomes molten and flows. The excess resin composition flows out of the spherical cavity due to the pressurization. The flow is carried out through a very small clearance between the upper portion 7 and the lower portion 8. At the same time, air present between the half shell 10 and the cavity surface 9 and air present between the half shell 10 and the core 2 are discharged from the spherical cavity.

Then, a mold clamping pressure is raised so that the resin composition is pressurized at a high pressure (STP14). By the pressurization at the high pressure, the upper portion 7 abuts on the lower portion 8 almost completely. Subsequently, the flow of the resin composition is rarely caused. By the pressurization at the high pressure (STP14), the resin composition takes a shape in conformity with the cavity surfaces 9. In other words, the dimples 4 having the shape obtained by inverted projections, is formed.

The temperature of the mold 6 is gradually reduced with the high mold-clamping pressure being maintained (STP15). In a stage in which the temperature is substantially lowered, the mold 6 is opened (STP16) and the golf ball 1 is removed (STP17).

In this manufacturing method, the air in the spherical cavity is sufficiently discharged at the low pressurizing step (STP12). Accordingly, a defect where the residual air enters the cover 3 is seldom caused. By pressurizing at a low pressure, the excess flow of the resin composition is suppressed. Therefore, the bare is caused with difficulty. In this manufacturing method, the defect rate is low.

The pressure at the low pressurizing step (STP12) is set to be 5 kgf/cm$^2$ to 50 kgf/cm$^2$. In some cases in which the pressure is less than this range, the air between the half shell 10 and the core 2 is not sufficiently discharged. From this viewpoint, it is more preferable that the pressure should be 10 kgf/cm$^2$ or more and is particularly preferable that the pressure should be 20 kgf/cm$^2$ or more. In some cases in which the pressure exceeds the range, the excess resin composition flows out. In addition, in some cases in which the pressure exceeds the range, the resin composition intensively flows out in a specific direction so that a cover 3 having an unequal thickness is molded. From this viewpoint, it is more preferable that the pressure should be 40 kgf/cm$^2$ or less.

The pressure at the high pressurizing step (STP14) is set to be 70 kgf/cm$^2$ or more. In some cases in which the pressure is less than the range, the resin composition excess flows out of the spherical cavity so that the bare is caused. From this viewpoint, it is more preferable that the pressure should be 80 kgf/cm$^2$ or more and is particularly preferable that the pressure should be 90 kgf/cm$^2$ or more. A large-scaled press machine is required for obtaining a very high pressure, although an excessive pressure can damage the mold 6. Therefore, the pressure is usually set to be 120 kgf/cm$^2$ or less.

A percentage ((Vh/Vc) * 100) of the total volume Vh of the two half shells 10 put in the mold 6 (STP10) to the volume Vc of the cover 3 is set to be 105% to 120%. In other words, 5% to 20% of the resin composition flows out of the spherical cavity. This amount of flowage is smaller than that in conventional golf ball manufacturing methods. In some cases in which the percentage is less than this range, it is hard to control the amount of flowage. From this viewpoint, it is more preferable that the percentage should be 107% or more. In some cases in which the percentage exceeds this range, the core 2 is moved with the flow of a large amount of the resin composition so that the cover 3 having an unequal thickness is molded. From this viewpoint, it is more preferable that the percentage should be 115%.

Figure 4:
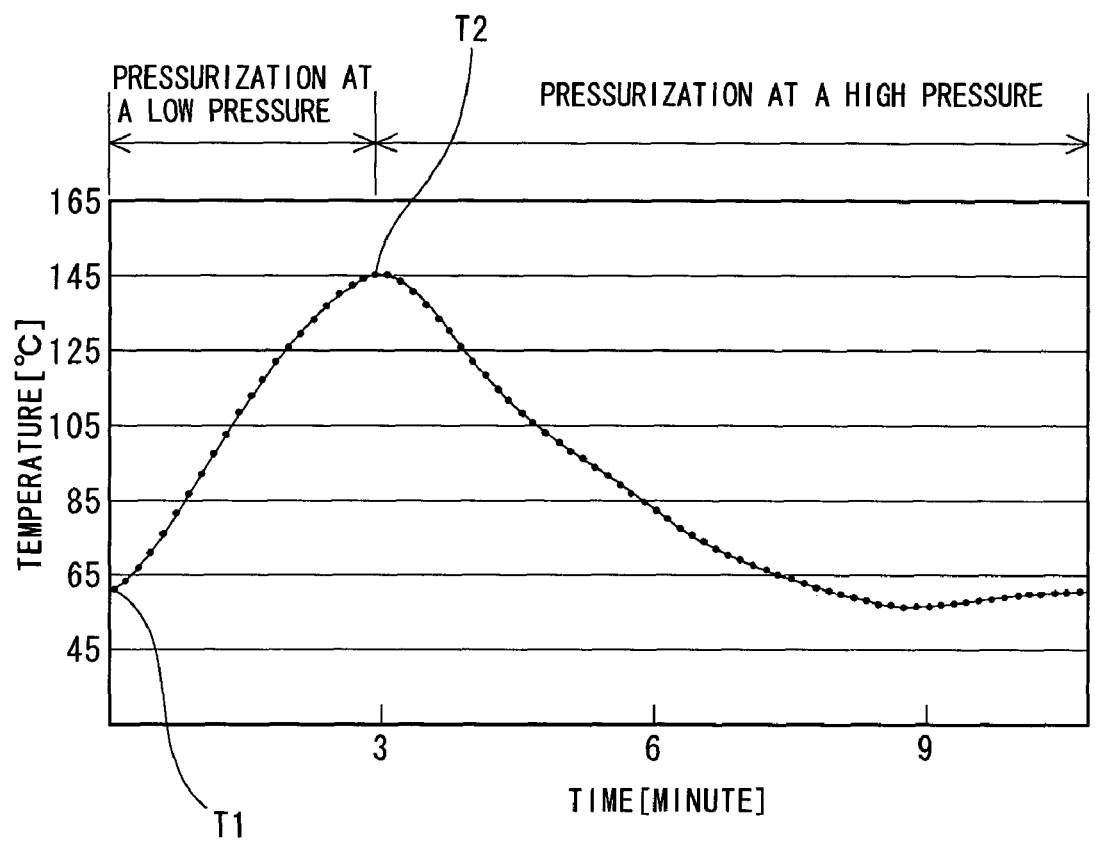
FIG. 4 is a graph showing a change in the temperature of the mold in the manufacturing method of FIG. 3.

FIG. 4 is a graph showing the change in the temperature of the mold 6 in the manufacturing method of FIG. 3. The graph shows the temperature obtained while the resin composition is heated at low and high pressures, that is, from mold clamping (STP11) to mold opening (STP16). In the graph, reference numeral T1 denotes the temperature of the mold 6 when pressurization at a low pressure is started. The reference numeral T2 denotes the highest temperature of the mold 6. As is apparent from FIG. 4, a time taken from the start of the pressurization at a low pressure to arrival at the highest temperature T2 is approximately 3 minutes in this example. In this example, the pressurization at high pressure is started after approximately 3 minutes. In other words, switching from the low pressure to the high pressure is carried out almost simultaneously with the arrival of the mold 6 at the highest temperature T2.

It is preferable that a difference (T2−Ts) between the highest temperature T2 and a softening point Ts of the thermoplastic resinous composition should be 30° C. to 80° C. If the difference (T2−Ts) is less than this range, a defect is apt to be caused by the residual air. From this viewpoint, it is more preferable that the difference (T2−Ts) should be 40° C. or more. If the difference (T2−Ts) exceeds this range, the bare is easily caused by the excess flow of resinous composition. From this viewpoint, it is more preferable that the difference (T2−Ts) should be 70° C. or less. The softening point Ts is measured by a thermomechanical analysis apparatus (a trade name of "TMA-50" manufactured by SHIMADZU CORPORATION). In the measurement, a load of 30 gf is applied to a needle to come in contact with the resinous composition. The displacement of a needle is read when the temperature of the resinous composition is gradually raised from an ordinary temperature. The intersecting point of tangents of peak is determined from the graph for the amount of the displacement and the temperature. The temperature on the intersecting point is represented as the softening point Ts.

It is preferable that the timing of a the transition from the pressurization at a low pressure (STP12) to the pressurization at a high pressure (STP14) should be set to be within a period of 30 seconds before and after the mold 6 reaches the highest temperature T2. Consequently, the air residue and the bare can be suppressed still more. From this viewpoint, it is more preferable that the timing of the transition should be set to be within a period of 20 seconds before and after the mold 6 reaches the highest temperature T2.

It is preferable that a difference (Ts−T1) between the softening point Ts and the temperature T1 of the mold 6 at the time of starting the low pressurizing step (STP12) should be 15° C. or more. In other words, it is preferable that the temperature T1 should be much lower than the softening point Ts. Consequently, the flow of a large amount of the resinous composition can be prevented in the early stage of the low pressurizing step (STP12). In this manufacturing method, a preheating step is not required. The preheating step implies a step of maintaining a state in which a mold clamping pressure is rarely applied to the resinous composition and heating the resin composition. If the difference (Ts−T1) is excessively great, the time taken for reaching the highest temperature T2 is increased. Therefore, it is preferable that the difference (Ts−T1) should be 50° C. or less.

The time taken for the low pressurizing step (STP12) is properly determined in consideration of the material of the cover 3, the thickness of the cover 3, an atmospheric temperature and the like. The time taken for the low pressurizing step (STP12) is usually 1 to 6 minutes. The time taken for the high pressurizing step (STP14) is properly determined in consideration of the material of the cover 3, the thickness of the cover 3, the atmosheric temperature and the like. The time taken for the high pressurizing step (STP12) is usually 3 to 15 minutes.

The nominal thickness of the cover 3 is generally 0.3 mm to 3.0 mm. In the cover 3 having a small nominal thickness, the air residue and the bare are easily generated. By employing the manufacturing method according to the present invention, it is possible to considerably reduce the defect rate when the cover 3 having a small nominal thickness is to be molded. The manufacturing method according to the present invention is suitable for manufacturing the golf ball 1 comprising the cover 3 having a nominal thickness of 0.3 mm to 1.0 mm. A regular octahedron inscribed on the phantom sphere of the golf ball is supposed and the closest land portion 5 to each of six vertexes of the regular octahedron is determined, and the thicknesses of the cover 3 which are measured under six land portions 5 are averaged. Thus, a nominal thickness is calculated.

The manufacturing method according to the present invention is suitable for the golf ball 1 comprising the cover 3 containing a thermoplastic elastomer as a principal component. Examples of a preferable thermoplastic elastomer include a polyurethane type thermoplastic elastomer, a polyamide type thermoplastic elastomer, a polyester type thermoplastic elastomer and a styrene type thermoplastic elastomer. Two kinds of thermoplastic elastomers or more may be used together. The manufacturing method according to the present invention is particularly suitable for a golf ball comprising a cover containing a soft elastomer (typically, a polyurethane type thermoplastic elastomer) as a principal component.

Specific examples of the polyurethane type thermoplastic elastomer include a trade name of "Elastolan" manufactured by BASF Polyurethane Elastomers Co., Ltd. Specific examples of the polyamide type thermoplastic elastomer include a trade name of "Pebax" manufactured by Atofina Japan Co., Ltd. Specific examples of the polyester type thermoplastic elastomer include a trade name of "Hytrel" manufactured by Dupont-Toray Co., Ltd. Specific examples of the styrene type thermoplastic elastomer include a trade name of "Rabalon" manufactured by Mitsubishi Chemical Corporation.

EXAMPLES

Example 1

A rubber composition containing polybutadiene as a base rubber was crosslinked to obtain a core having a diameter of 41.1 mm. On the other hand, 80 parts by weight of a polyurethane type thermoplastic elastomer (a trade name of "Elastolan XNY97A" manufactured by BASF Polyurethane Elastomers Co., Ltd.), 20 parts by weight of a polyamide type thermoplastic elastomer (a trade name of "Pebax 5533" manufactured by Toray Industries, Inc.) and 5 parts by weight of titanium dioxide were kneaded by a twin extruder to obtain a resin composition. A softening point Ts of the resin composition was approximately 90° C. A half shell having a thickness of 0.9 mm was obtained from the resin composition by an injection molding method. The core was covered with two half shells and was put in a mold shown in FIG. 2, and a cover was formed under conditions shown in the following Table 1. The cover had a thickness of 0.8 mm.

Example 2

A cover was formed in the same manner as that in the example 1 except that a temperature T1 in mold clamping was set as shown in the following Table 1.

Examples 3 and 4

A cover was formed in the same manner as that in the example 1 except that the highest temperature T2 was set as shown in the following Table 1.

Examples 5 and 6

A cover was formed in the same manner as that in the example 1 except that a time taken for reaching the highest temperature T2 was set as shown in the following Table 1.

Example 7 and Comparative Example 1

A cover was formed in the same manner as that in the example 1 except that a pressure at a high pressurizing step was set as shown in the following Table 1.

Examples 8 and 9 and Comparative Examples 2 and 3

A cover was formed in the same manner as that in the example 1 except that a pressure at a low pressurizing step was set as shown in the following Table 2.

Examples 10 and 11 and Comparative Examples 4 and 5

A cover was formed in the same manner as that in the example 1 except that a percentage ((Vh/Vc)*100) was set as shown in the following Table 2.

[Calculation of Degree of Uneven Thickness]

The thickness of a cover provided under the land portion of a golf ball was measured and a maximum value and a minimum value in one golf ball were measured. A value obtained by decreasing the minimum value from the maximum value was divided by a nominal thickness. Thus, a degree of uneven thickness was obtained. A mean value of the degrees of uneven thickness for 50 golf balls is shown in the following Tables 1 and 2.

[Evaluation of Appearance]

The appearances of 1000 golf balls were visually observed. The number of the golf balls having a portion in which air remains in a cover and that of the golf balls having a portion in which bare is generated were counted to calculate the generation rate of a defect. The result is shown in the following Tables 1 and 2.

TABLE 1

| | | Example 1 | Example 2 | Example 3 | Example 4 | Example 5 | Example 6 | Com. Exam. 1 | Example 7 |
|---|---|---|---|---|---|---|---|---|---|
| Diameter of core (mm) | | 41.1 | 41.1 | 41.1 | 41.1 | 41.1 | 41.1 | 41.1 | 41.1 |
| Thickness of cover (mm) | | 0.8 | 0.8 | 0.8 | 0.8 | 0.8 | 0.8 | 0.8 | 0.8 |
| Thickness of half shell (mm) | | 0.9 | 0.9 | 0.9 | 0.9 | 0.9 | 0.9 | 0.9 | 0.9 |
| (Vh/Vc)*100 | | 113 | 113 | 113 | 113 | 113 | 113 | 113 | 113 |
| Stage of low pressure | Pressure (kgf/cm$^2$) | 30 | 30 | 30 | 30 | 30 | 30 | 30 | 30 |
| | Time (minute) | 3.0 | 3.0 | 3.0 | 3.0 | 3.0 | 3.0 | 3.0 | 3.0 |
| Stage of high pressure | Pressure (kgf/cm$^2$) | 110 | 110 | 110 | 110 | 110 | 110 | 60 | 70 |
| | Time (minute) | 9.0 | 9.0 | 9.0 | 9.0 | 9.0 | 9.0 | 9.0 | 9.0 |
| Time taken for reaching highest temperature T2 (minute) | | 3.0 | 3.0 | 3.0 | 3.0 | 2.5 | 3.5 | 3.0 | 3.0 |
| Highest temperature T2 (° C.) | | 145 | 145 | 120 | 170 | 145 | 145 | 145 | 145 |
| Difference in temperature (T2 − Ts) (° C.) | | 55 | 55 | 30 | 80 | 55 | 55 | 55 | 55 |
| Temperture T1 at mold clamping (° C.) | | 60 | 80 | 60 | 60 | 60 | 60 | 60 | 60 |
| Difference in temperature (Ts − T1) (° C.) | | 30 | 10 | 30 | 30 | 30 | 30 | 30 | 30 |
| Variation in thickness of cover (mm) | | 0.11 | 0.10 | 0.15 | 0.13 | 0.10 | 0.12 | 0.20 | 0.16 |
| Generation rate of air residue (%) | | 0 | 0 | 0 | 0 | 0 | 0 | 0 | 0 |
| Generation rate of bare (%) | | 0 | 0 | 0 | 0 | 0 | 0 | 20 | 0 |

TABLE 2

| | | Com. Exam. 2 | Example 8 | Example 9 | Com. Exam. 3 | Com. Exam. 4 | Example 10 | Example 11 | Com. Exam. 5 |
|---|---|---|---|---|---|---|---|---|---|
| Diameter of core (mm) | | 41.1 | 41.1 | 41.1 | 41.1 | 41.1 | 41.1 | 41.1 | 41.1 |
| Thickness of cover (mm) | | 0.8 | 0.8 | 0.8 | 0.8 | 0.8 | 0.8 | 0.8 | 0.8 |
| Thickness of half shell (mm) | | 0.9 | 0.9 | 0.9 | 0.9 | 0.81 | 0.85 | 0.95 | 1 |
| (Vh/Vc)*100 | | 113 | 113 | 113 | 113 | 101 | 107 | 120 | 126 |
| Stage of low pressure | Pressure (kgf/cm$^2$) | 0 | 5 | 50 | 60 | 30 | 30 | 30 | 30 |
| | Time (minute) | 3.0 | 3.0 | 3.0 | 3.0 | 3.0 | 3.0 | 3.0 | 3.0 |
| Stage of high pressure | Pressure (kgf/cm$^2$) | 110 | 110 | 110 | 110 | 110 | 110 | 110 | 110 |
| | Time (minute) | 9.0 | 9.0 | 9.0 | 9.0 | 9.0 | 9.0 | 9.0 | 9.0 |
| Time taken for reaching highest temperature T2 (minute) | | 3.0 | 3.0 | 3.0 | 3.0 | 3.0 | 3.0 | 3.0 | 3.0 |

TABLE 2-continued

| | Result of Evaluation | | | | | | | |
|---|---|---|---|---|---|---|---|---|
| | Com. Exam. 2 | Example 8 | Example 9 | Com. Exam. 3 | Com. Exam. 4 | Example 10 | Example 11 | Com. Exam. 5 |
| Highest temperature T2 (° C.) | 145 | 145 | 145 | 145 | 145 | 145 | 145 | 145 |
| Difference in temperature (T2 − Ts) (° C.) | 55 | 55 | 55 | 55 | 55 | 55 | 55 | 55 |
| Temperture T1 at mold clamping (° C.) | 60 | 60 | 60 | 60 | 60 | 60 | 60 | 60 |
| Difference in temperature (Ts − T1) (° C.) | 30 | 30 | 30 | 30 | 30 | 30 | 30 | 30 |
| Variation in thickness of cover (mm) | 0.05 | 0.09 | 0.19 | 0.31 | 0.04 | 0.06 | 0.25 | 0.45 |
| Generation rate of air residue (%) | 36 | 0 | 0 | 0 | 0 | 0 | 0 | 0 |
| Generation rate of bare (%) | 52 | 0 | 0 | 26 | 16 | 0 | 0 | 0 |

As shown in the Tables 1 and 2, a defect rate is smaller in the manufacturing method according to each of the examples than that in the manufacturing method according to each of the comparative examples. From the result of the evaluation, the advantage of the present invention is apparent.

The above description is only illustrative and various changes can be made without departing from the scope of the present invention.

What is claimed is:

1. A method of manufacturing a golf ball having a solid core and a cover which comprises:
   forming a solid core,
   a first step of forming two hemispherical half shells made of a thermoplastic resinous composition, the total volume of the two half shells being 105% to 120% of the volume of the cover,
   a second step of covering the solid core with the half shells in an open mold containing upper and lower portions, each of which having a hemispherical cavity,
   a third step of clamping the mold
   a fourth step of heating the thermoplastic resinous composition in a spherical cavity formed by the mold and pressurizing the thermoplastic resinous composition at a pressure of 5 kgf/cm² to 50 kgf/cm², and causing the excess thermoplastic resinous composition to flow out of the spherical cavity;
   a fifth step of heating the thermoplastic resinous composition in the spherical cavity and pressurizing the thermoplastic resinous composition at a pressure of 70 kgf/cm² or more to form the cover, and
   removing the golf ball from the mold.

2. The method of manufacturing a golf ball according to claim 1, wherein a difference (T2−Ts) between the highest temperature T2 of the mold and the softening point Ts of the thermoplastic resinous composition through the fourth and fifth steps is 30° C. to 80° C.

3. The method of manufacturing a golf ball according to claim 2, wherein a transition from the fourth step to the fifth step is carried out within a period of 30 seconds before and after the mold reaches the highest temperature T2.

4. The method of manufacturing a golf ball according to claim 1, wherein a difference (Ts−T1) between the softening point Ts of the thermoplastic resinous composition and the temperature T1 of the mold at time of the start of the fourth step is 15° C. or more.

5. The method of manufacturing a golf ball according to claim 1, wherein the cover formed at the fifth step has a nominal thickness of 0.3 mm to 1.0 mm.

* * * * *